US010819786B2

(12) United States Patent
Shoshan et al.

(10) Patent No.: US 10,819,786 B2
(45) Date of Patent: Oct. 27, 2020

(54) LOCAL THIN CLOUD TENANT

(71) Applicant: SAP SE, Walldorf (DE)

(72) Inventors: Itzhak Shoshan, Even Yehuda (IL); Avi Rokach, Kfar Saba (IL)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/151,568

(22) Filed: Oct. 4, 2018

(65) Prior Publication Data

US 2020/0112607 A1 Apr. 9, 2020

(51) Int. Cl.
*H04L 29/08* (2006.01)

(52) U.S. Cl.
CPC ........ *H04L 67/1095* (2013.01); *H04L 67/325* (2013.01); *H04L 67/327* (2013.01); *H04L 67/34* (2013.01)

(58) Field of Classification Search
CPC . H04L 67/1095; H04L 67/325; H04L 67/327; H04L 67/34; H04L 29/0854; H04L 61/1552; H04L 69/40; H04L 67/10; H04L 69/00; H04L 67/1097; G06F 9/54; G06F 9/5072; G06F 11/2033; G06F 17/30289
See application file for complete search history.

(56) References Cited

U.S. PATENT DOCUMENTS

| | | | |
|---|---|---|---|
| 9,613,064 B1 * | 4/2017 | Chou | G06F 16/182 |
| 2007/0233811 A1 | 10/2007 | Rochelle et al. | |
| 2012/0192079 A1 | 7/2012 | Burk | |
| 2012/0254984 A1 * | 10/2012 | Levien | G06F 21/35 726/16 |
| 2015/0169419 A1 * | 6/2015 | Carney | H04L 69/00 714/4.11 |
| 2019/0149619 A1 * | 5/2019 | Lisac | H04L 67/16 709/203 |

FOREIGN PATENT DOCUMENTS

WO 2013095485 A1 6/2013

OTHER PUBLICATIONS

"Communication: European Extended Search Report", dated Feb. 13, 2020, European Patent Office, European Application No. 19194223.4-1203, 10 pp.

\* cited by examiner

*Primary Examiner* — Muhammad Raza
(74) *Attorney, Agent, or Firm* — Buckley, Maschoff & Talwalkar LLC

(57) ABSTRACT

According to some embodiments, a local thin cloud tenant computer platform is coupled to a user synchronization data store and to a remote user cloud application executing at a data center via a distributed communication network. The local thin cloud tenant computer platform may receive synchronization information from the remote user cloud application and store it into the user synchronization data store. When the local thin cloud tenant computer platform determines that the remote user cloud application is unable to respond to a request from a local user device, the synchronization information in the user synchronization data store may be accessed to provide limited functionality associated with the remote user cloud application. The local thin cloud tenant computer platform may then transmit a response to the request from the local user device.

10 Claims, 15 Drawing Sheets

LOCAL THIN CLOUD TENANT

FIELD

Some embodiments are associated with support of local user devices accessing a remote cloud application (e.g., executing at a data center). In particular, some embodiments provide a local thin cloud tenant to provide limited functionality when the remote cloud application is not available.

BACKGROUND

In some cases, an enterprise may let users access a user application executing in the cloud. For example, a human resources department might let employees access a payroll application executing in the cloud. As used herein, the phrases "cloud" or "cloud computing" might refer to a shared pool of configurable computer system resources and higher-level services that can be provisioned with minimal management effort, such as service that may be accessed via the Internet. The availability of a cloud application may be important, and in some cases critical to an enterprise. If the cloud application becomes unavailable for any reason (e.g., a lost Internet connection or problem at a data center hosting the application), hundreds of thousands of users might be impacted.

To avoid this result, various cloud failover architectures exists, but these approaches are handled by a cloud service provider and usually need to incorporate special implementations in the user application (which can be time consuming and expensive to incorporate). Even when an appropriate failover architecture is implemented, note that there is still a substantial chance that availability will be limited to certain regions or countries. In another approach, an enterprise might implement semi-connected scenarios (e.g., such as for mobile clients). For example, a local cache can be implement but all transactions are still done locally and, as a result, there is no synchronization or visibility between clients. In still an approach to avoid downtime, a corporate cache (e.g., a proxy) can be used to cache static content. This technique, however, does not support fully interactive transactions (e.g., which might change data as part of the transaction).

It may therefore be desirable to provide systems and methods to facilitate local, limited support of user cloud applications in an automated and logical manner.

SUMMARY OF THE INVENTION

According to some embodiments, systems, methods, apparatus, computer program code and means are provided to facilitate local, limited support of user cloud applications in an automated and logical manner. According to some embodiments, a local thin cloud tenant computer platform is coupled to a user synchronization data store and to a remote user cloud application executing at a data center via a distributed communication network. The local thin cloud tenant computer platform may receive synchronization information from the remote user cloud application and store it into the user synchronization data store. When the local thin cloud tenant computer platform determines that the remote user cloud application is unable to respond to a request from a local user device, the synchronization information in the user synchronization data store may be accessed to provide limited functionality associated with the remote user cloud application. The local thin cloud tenant computer platform may then transmit a response to the request from the local user device.

Some embodiments comprise: means for receiving, at a local thin cloud tenant computer platform coupled to a remote user cloud application executing at a data center via a distributed communication network, synchronization information from the remote user cloud application; means for storing the synchronization information, by the local thin cloud tenant computer platform, into a user synchronization data store; means for determining, by the local thin cloud tenant computer platform, that the remote user cloud application is unable to respond to a request from a local user device; means for accessing, by the local thin cloud tenant computer platform, the synchronization information in the user synchronization data store to provide limited functionality associated with the remote user cloud application; and means for transmitting, by the local thin cloud tenant computer platform, a response to the request from the local user device.

In some embodiments, a communication device associated with a local thin cloud tenant exchanges information with remote user devices (e.g., a user who is accessing content, such as electronic files) and/or a user cloud application. The information may be exchanged, for example, via public and/or proprietary communication networks.

Technical effects of some embodiments of the invention are improved and computerized ways to facilitate local, limited support of user cloud applications in an automated and logical manner. With these and other advantages and features that will become hereinafter apparent, a more complete understanding of the nature of the invention can be obtained by referring to the following detailed description and to the drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
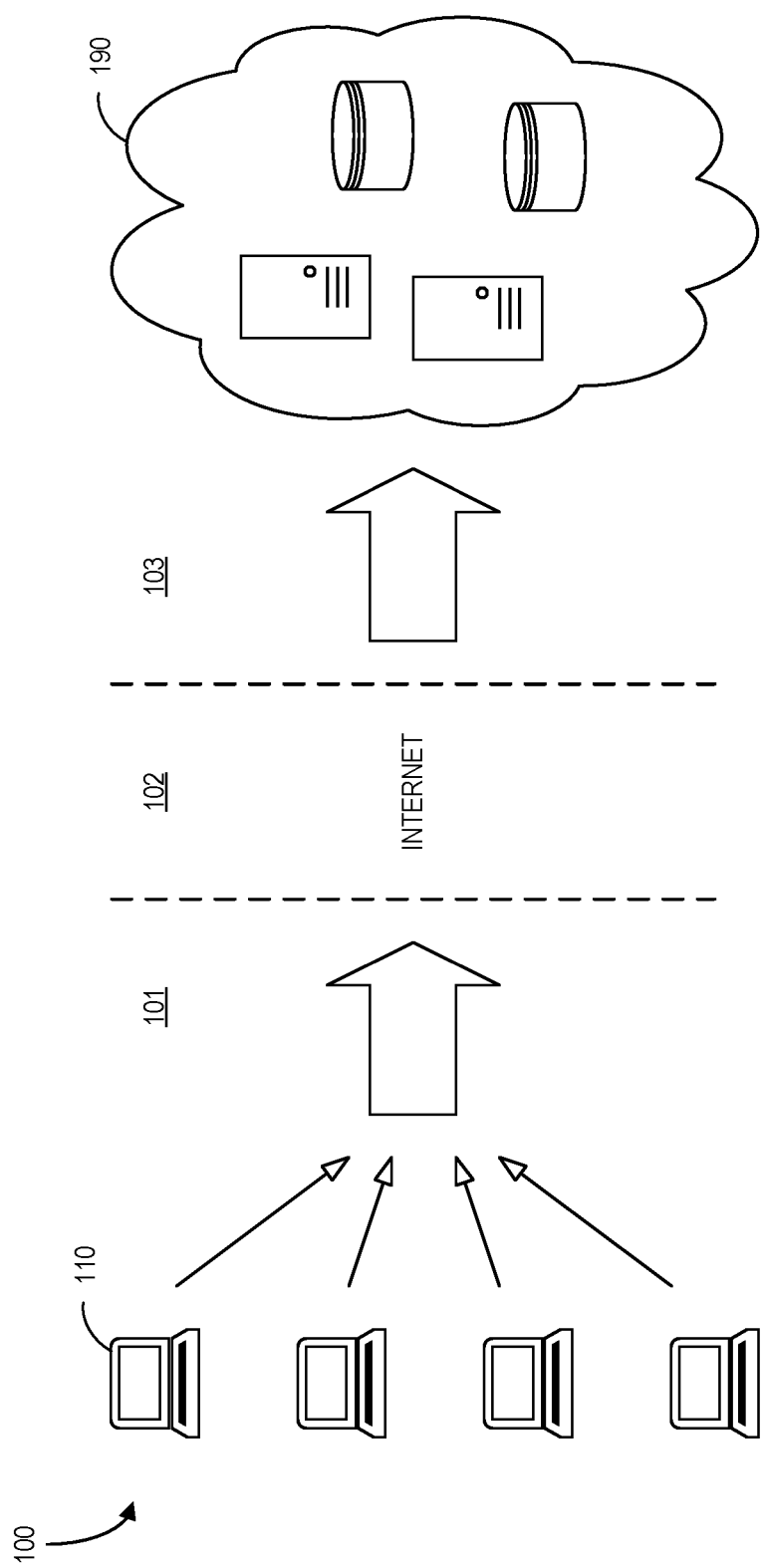
FIG. 1 is a block diagram of system wherein local user devices access a remote user cloud application via the Internet.

FIG. 1 is a block diagram of system 100 wherein local user devices 110 access a remote user cloud application 190 via the Internet 102. The user devices 110 are on a user side 101 opposite a data center side 103 (with the Internet 102 being in the middle). For example, a user at a local device 110 might transmit a request to access a purchase order through the Internet 102, and the remote user cloud application 190 might respond to that request by supplying the appropriate information.

Figure 2:
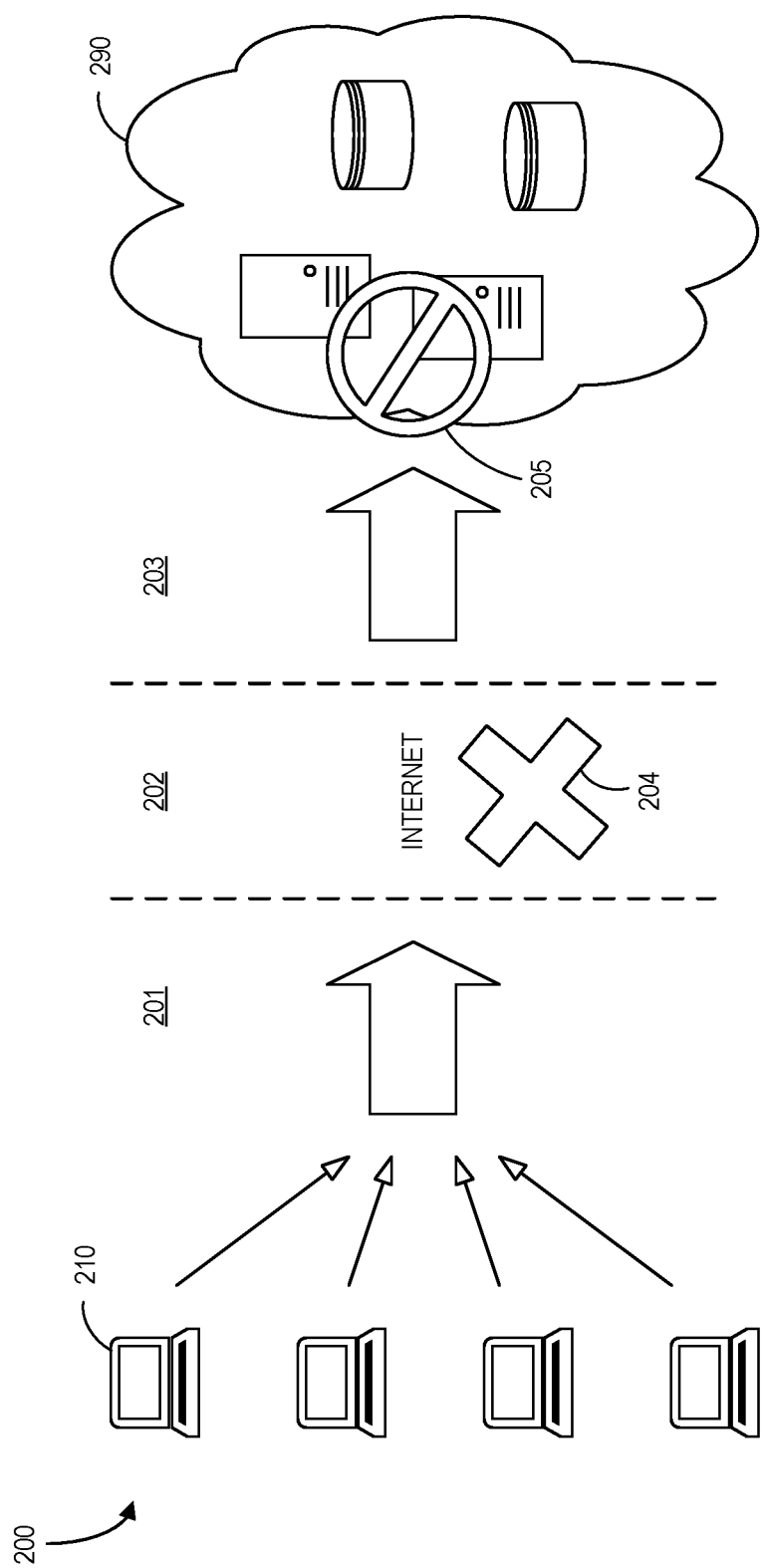
FIG. 2 is a block diagram of system experiencing one or more connectivity problems.

In some cases, however, the user cloud application 190 might become unavailable. FIG. 2 is a block diagram of system 200 experiencing one or more connectivity problems. In this case, a failed Internet 202 connection 204 or problem 205 at a data center 290 will completely prevent local user devices 210 on a user side 201 from accessing a remote user cloud application 290 at a data center side 203. It may therefore be desirable to provide systems and methods to facilitate local, limited support of user cloud applications in an automated and logical manner.

Figure 3:
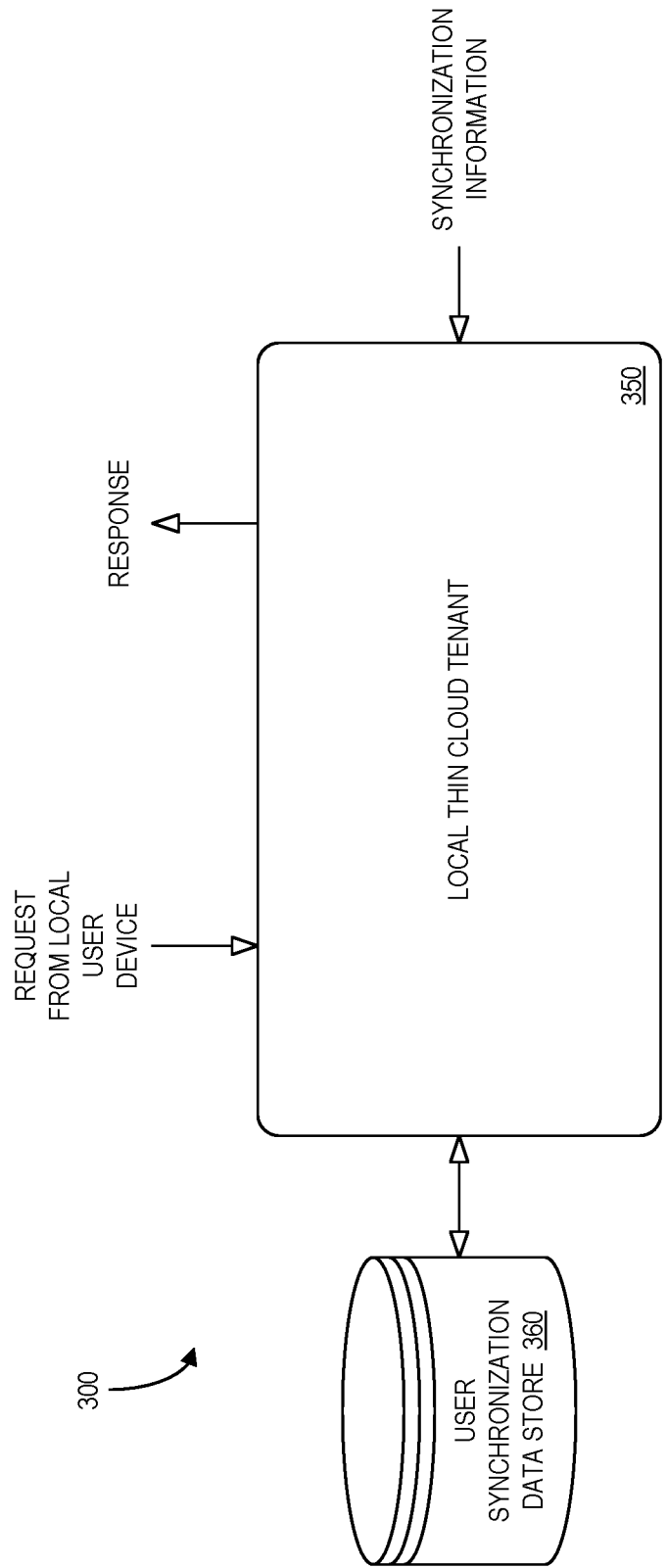
FIG. 3 is a block diagram of a system according to some embodiments.

FIG. 3 is a block diagram of a system 300 according to some embodiments. In particular, the system includes a local thin cloud tenant 350 that receives synchronization information (e.g., from a data center) and stores the information into a user synchronization data store 360. As used herein, the term "tenant" may refer to a software architecture in which a single instance of software runs on a server and serves multiple tenants. In this case, a "tenant" is a group of users who share a common access with specific privileges to the software instance. With a multitenant architecture, a software application may be designed to provide each tenant with a dedicated share of the instance—including the data, configuration, user management, tenant individual functionality, non-functional properties, etc. The local thin cloud tenant 350 may access information in the user synchronization data store 360 to provide limited functionality associated with a remote user cloud application (e.g., when the application is not available). In particular, the local thin cloud tenant may receive requests from local user devices and transmit responses to those requests. According to some embodiments, the user synchronization data store 360 contains electronic data records associated with the state of user cloud application data. The local thin cloud tenant 350 might be, for example, associated with a Personal Computers ("PC"), laptop computer, an enterprise server, a server farm, and/or a database or similar storage devices.

As used herein, devices, including those associated with the local thin cloud tenant 350 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

According to some embodiments, an "automated" local thin cloud tenant 350 may support limited functionality of a remote user cloud application (e.g., when it is unavailable for any reason). As used herein, the term "automated" may refer to, for example, actions that can be performed with little or no human intervention.

The local thin cloud tenant 350 may store information into and/or retrieve information from the user synchronization data store 360. The user synchronization data store 360 may be a locally stored relational database or reside physically remote from the local thin cloud tenant 350 (while still remaining on the same "side" of an Internet connection). The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical administrator interface may provide an ability to access and/or modify elements of the system. The administrator interface might, for example, let an operator apply logic to local thin cloud tenant settings, adjust functionality prediction rules, etc.

Although a single local thin cloud tenant 350 is shown in FIG. 1, any number of such devices may be included. Moreover, various devices described herein might be combined according to embodiments of the present invention. For example, in some embodiments, the local thin cloud tenant 350 and user synchronization data store 360 might be co-located and/or may comprise a single apparatus. Moreover, the functions described herein might be implemented by a service provider (e.g., performing services for one or more enterprises, departments, or businesses).

Figure 4:
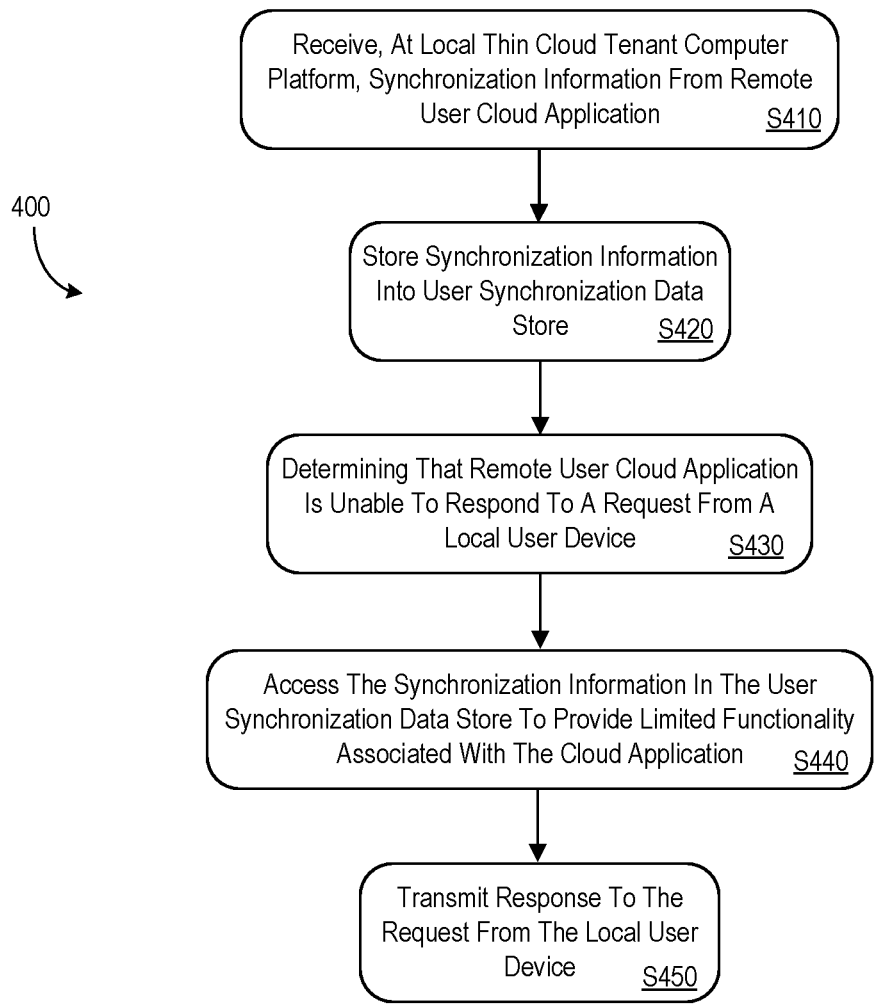
FIG. 4 illustrates method in accordance with some embodiments.

FIG. 4 illustrates a method 400 that might be performed by some or all of the elements of the system 300 described with respect to FIG. 3, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a local thin cloud tenant computer platform might receive synchronization information from a remote user cloud application. At S220, the local thin cloud tenant may store the synchronization information into a user synchronization data store. At S230, the local thin cloud tenant computer platform may determine that the remote user cloud application is unable to respond to a request from a local user device. For example, an Internet connection might be lost or a data center might be experiencing a problem (e.g., a power outage or blackout). At S240, the local thin cloud tenant computer platform may access the synchronization information in the user synchronization data store to provide limited functionality associated with the remote user cloud application. The "limited" functionality might comprise, for example: no service for a standard service type; limited functionality with "view only" data for an important service type; and full transactional functionality for a critical service type (e.g., as defined by an administrator or automatically predicted by the system).

At S250, the local thin cloud tenant computer platform may transmit a response to a request from a local user device (e.g., a response supporting the limited functionality being provided). When the local thin cloud tenant later determines that the remote user cloud application is again able to respond to requests from local user devices, it can transmit update information to the remote user cloud application based on the limited functionality previously provided to local user devices.

Figure 5:
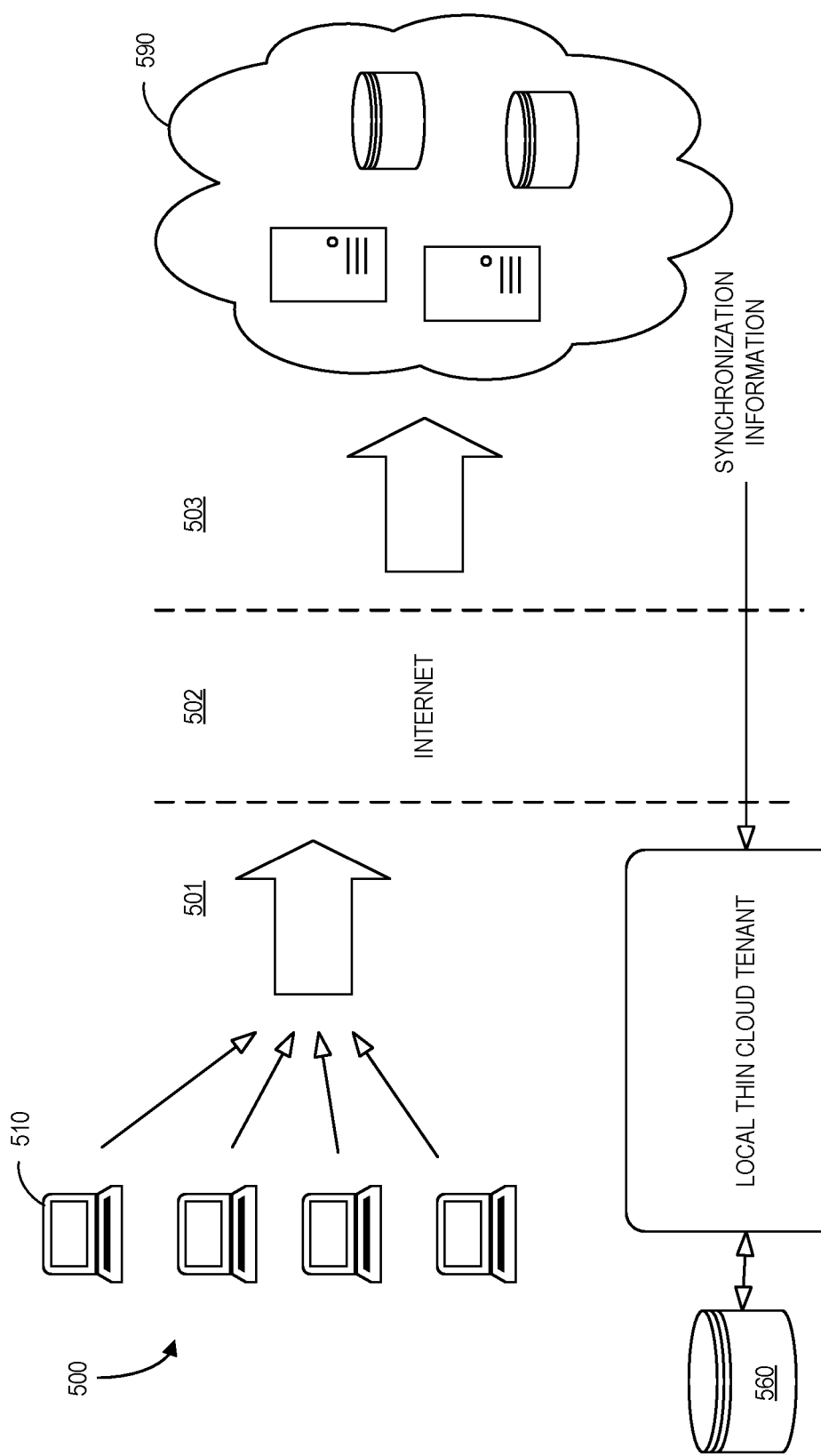
FIG. 5 illustrates a user cloud application solution according to some embodiments.

FIG. 5 illustrates a user cloud application solution 500 according to some embodiments. As before, local user devices 510 access a remote user cloud application 590 via the Internet 502. The user devices 510 are on a user side 501 opposite a data center side 503 (with the Internet 502 being in the middle). For example, a user at a local device 510 might transmit a request to access a purchase order through the Internet 502, and the remote user cloud application 590 might respond to that request by supplying the appropriate information. In this embodiment, however, a local thin cloud tenant 550 and a user synchronization data store 560 remain in a "sleep" runtime mode on the user side 501 (e.g., because the remote user cloud application executing at the data center 590 is currently available and being used by the local user devices 510). In this mode, the local thin cloud tenant 550 receives and stores synchronization information from the data center 590.

Figure 6:
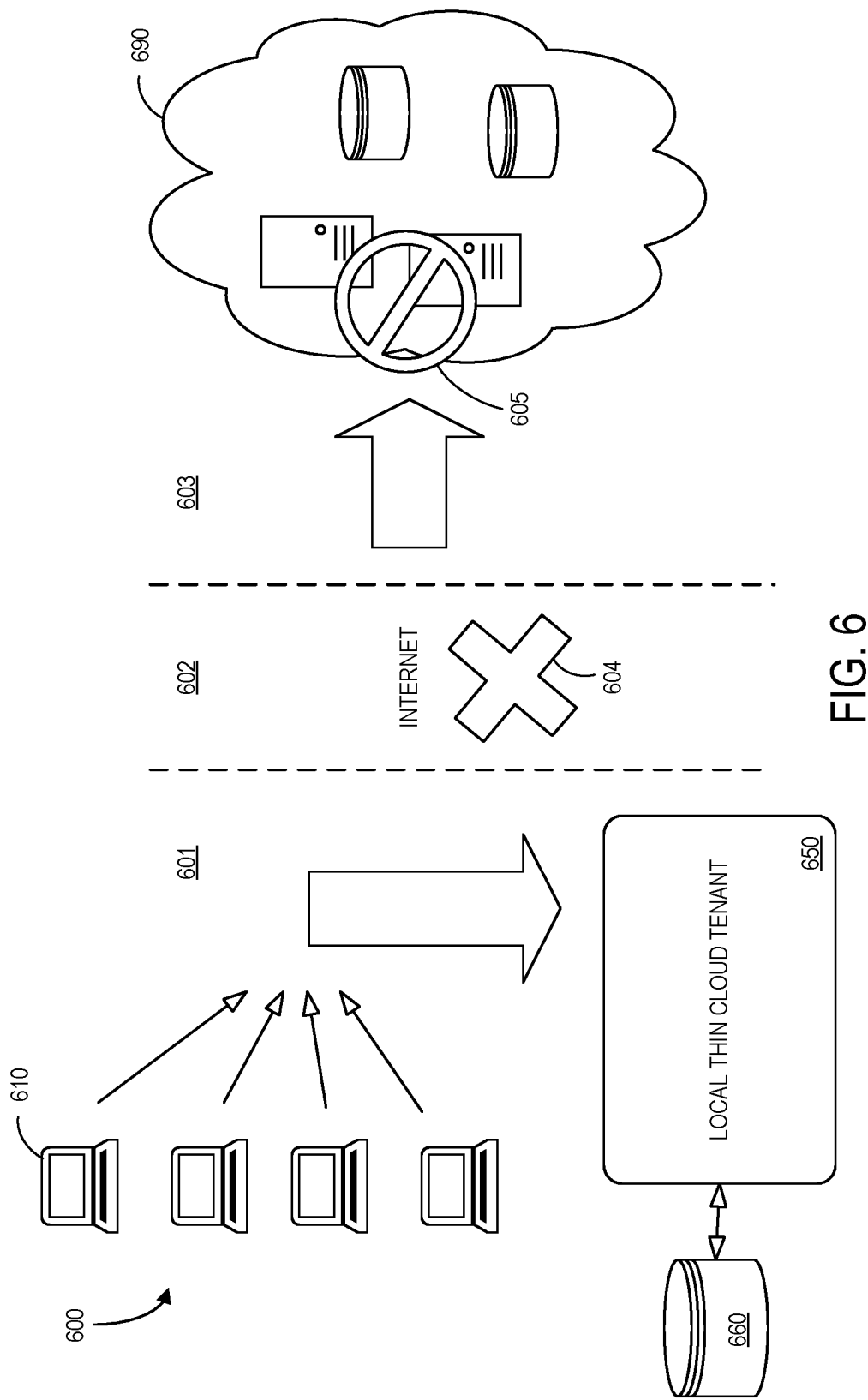
FIG. 6 illustrates system with a local thin cloud tenant computer platform in "rise" runtime mode in accordance with some embodiments.

Note, however, the user cloud application 590 might become unavailable. FIG. 6 illustrates system 600 with a local thin cloud tenant computer platform 650 in a "rise" runtime mode in accordance with some embodiments. In this case, a failed Internet 602 connection 604 or problem 605 at a data center 690 may completely prevent local user devices 610 on a user side 601 from accessing a remote user cloud application 690 at a data center side 603. Instead, requests from the local user devices 610 are served by a local thin cloud tenant 650 (e.g., based on information in a user synchronization data store 660) once it identifies that a connectivity issue to the cloud exists. Note that every customer or user might decide which services are critical and need to be fully working (and what other services might be important may be limited without too much of a problem). For example, a customer might decide that the local thin cloud tenant 650 should make "sales" and "customer" modules available for viewing only while an "opportunities" module should remain fully functional.

Figure 7:
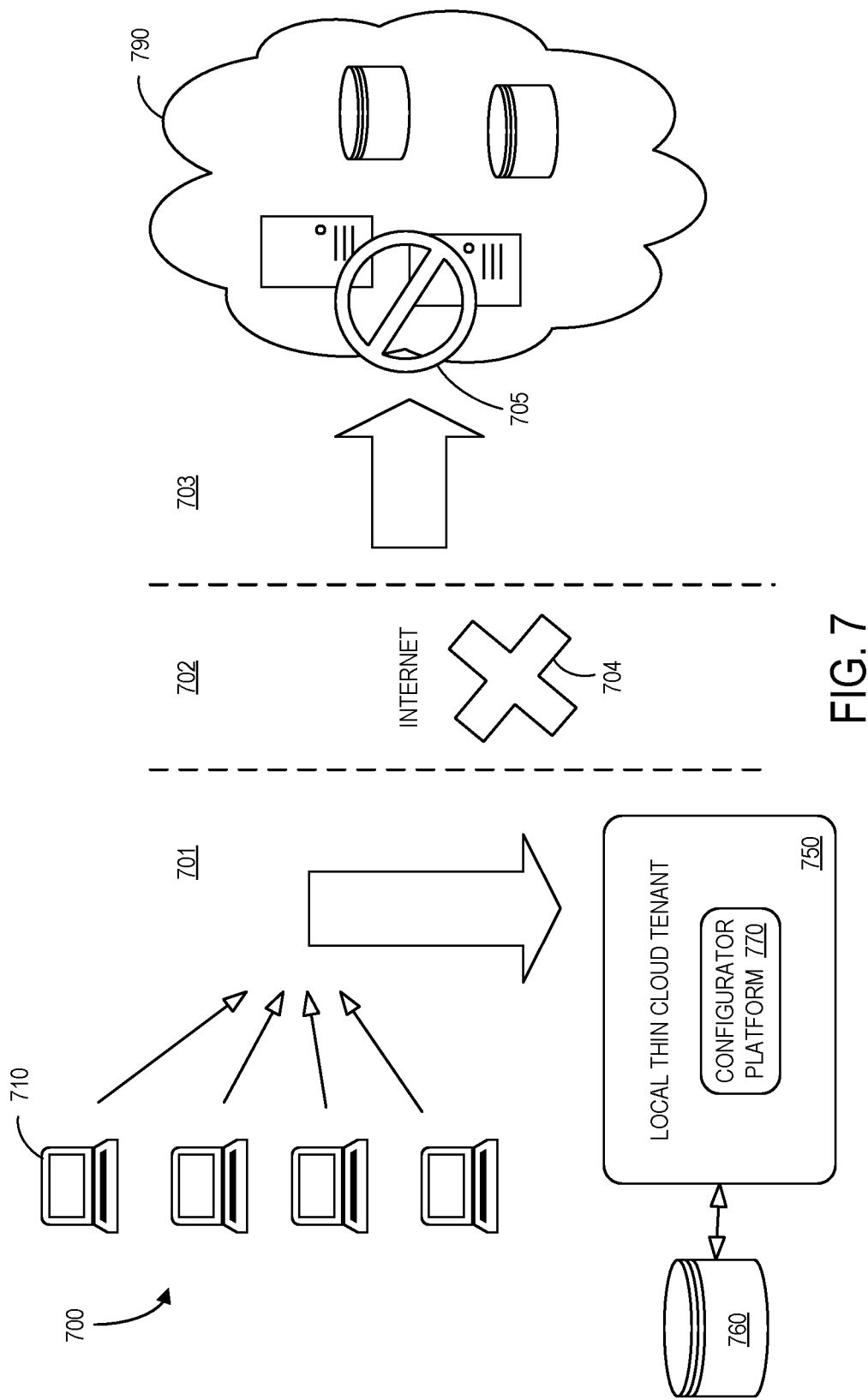
FIG. 7 illustrates a system supporting different types of service configurations according to some embodiments.

According to some embodiments, a configurator platform may automatically configure the limited functionality associated with a remote user cloud application. FIG. 7 illustrates a system 700 supporting different types of service configurations according to some embodiments. As before, a failed Internet 702 connection 704 or problem 705 at a data center 790 may completely prevent local user devices 710 on a user side 701 from accessing a remote user cloud application 790 at the data center side 703. Instead, requests from the local user devices 710 are served by a local thin cloud tenant 750 (e.g., based on information in the user synchronization data store 760) once it identifies that a connectivity issue to the cloud exists. In this embodiment, a configurator platform 770 may configure limited functionality. For example, the limited functionality might be automatically configured based on hardware, network, storage limitations, etc. (and the configurator platform 700 may self-configure required data to synchronize and service configuration). Note that an administrator might override the configuration and instead manually configure the local thin cloud tenant 750. According to some embodiments, the configurator platform 770 may support several service configuration types: "critical" (full transaction service functionality); "important" (read only service functionality); and "standard" (offline and service is not available). The configurator platform 770 may select the appropriate configuration type based on a hardware configuration, network bandwidth and latency information, a storage limitation, a manual override from an administrator, etc.

Figure 8:
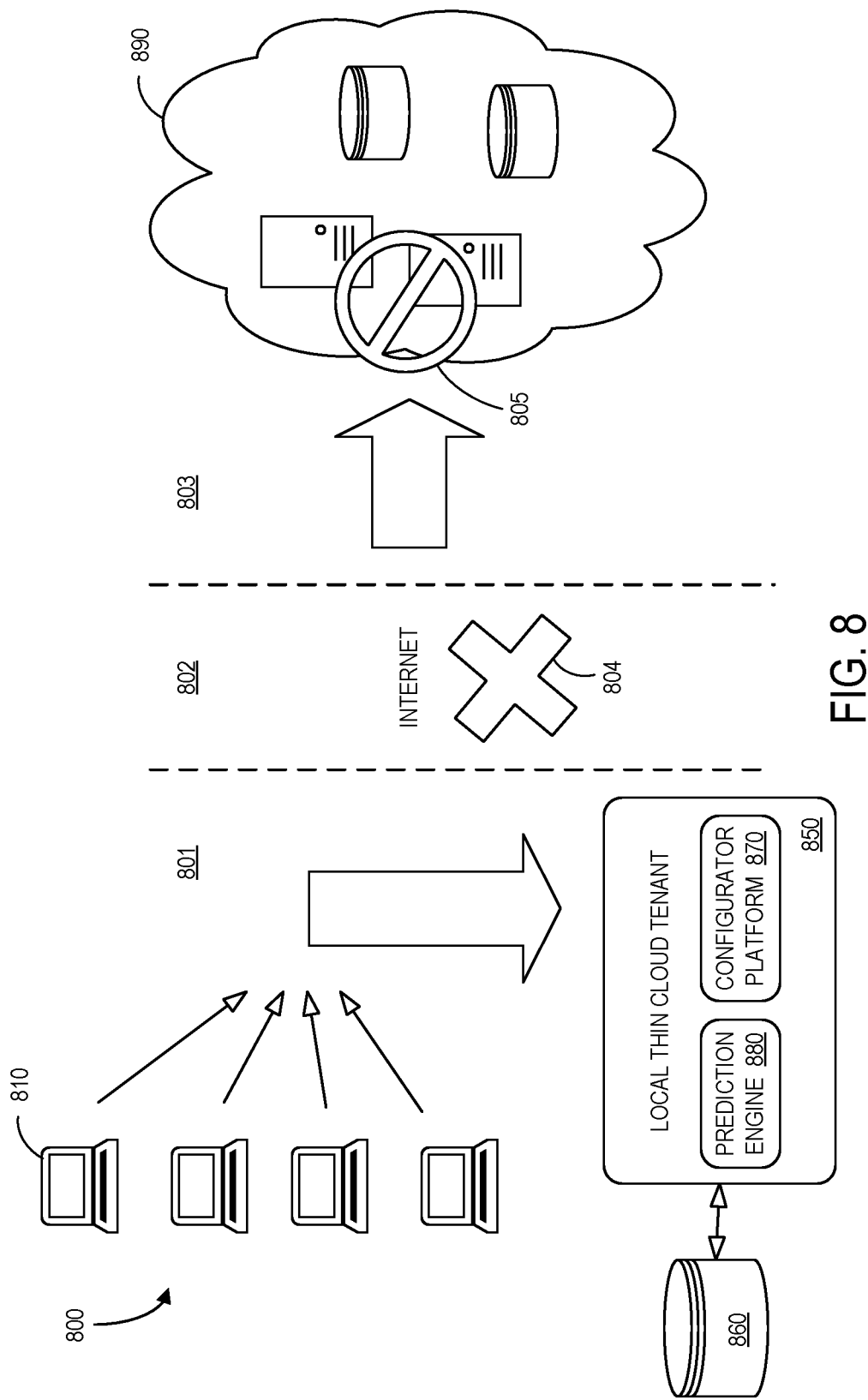
FIG. 8 illustrates a system that predicts future user requests in accordance with some embodiments.

According to some embodiments, the configurator platform may be associated with a prediction engine to predict future requests from local user devices based on historical requests from local user devices. FIG. 8 illustrates a system 800 that predicts future user requests in accordance with some embodiments. As before, a failed Internet 802 connection 804 or problem 805 at a data center 890 may completely prevent local user devices 810 on a user side 801 from accessing a remote user cloud application 890 at the data center side 803. Instead, requests from the local user devices 810 are served by a local thin cloud tenant 850 (e.g., based on information in the user synchronization data store 860) once it identifies that a connectivity issue to the cloud exists. In this embodiment, a configurator platform 870 may use a prediction engine 880 to help configure limited functionality. For example, the prediction engine 880 may analyze historical requests, including information about a request type, an enterprise group, a time-of-day, a day-of-week, a day-of-month, a time-of-year, etc. The prediction engine may also get as an input local thin cloud tenant 850 capacity in terms of: storage, Central Processing Unit ("CPU") power, Random Access Memory ("RAM") abilities, network bandwidth and latency, etc. The prediction engine 880 may thus take capacity into consideration to prioritize services according to predicted usage based on historical usage (and may help categorize services as critical, important, or standard). For example, in an enterprise Human Resources ("HR") solution, historical data might show that employee performance management is being used heavily at the beginning of the year and lightly during the year, while employee benefits management is being used mostly at the end of each month (and categorize services as appropriate to support functions when they are most needed). That a system administrator may override the prediction engine 800 configuration and manually configure the services to critical, important, or standard services as he or she deems appropriate.

Figure 9:
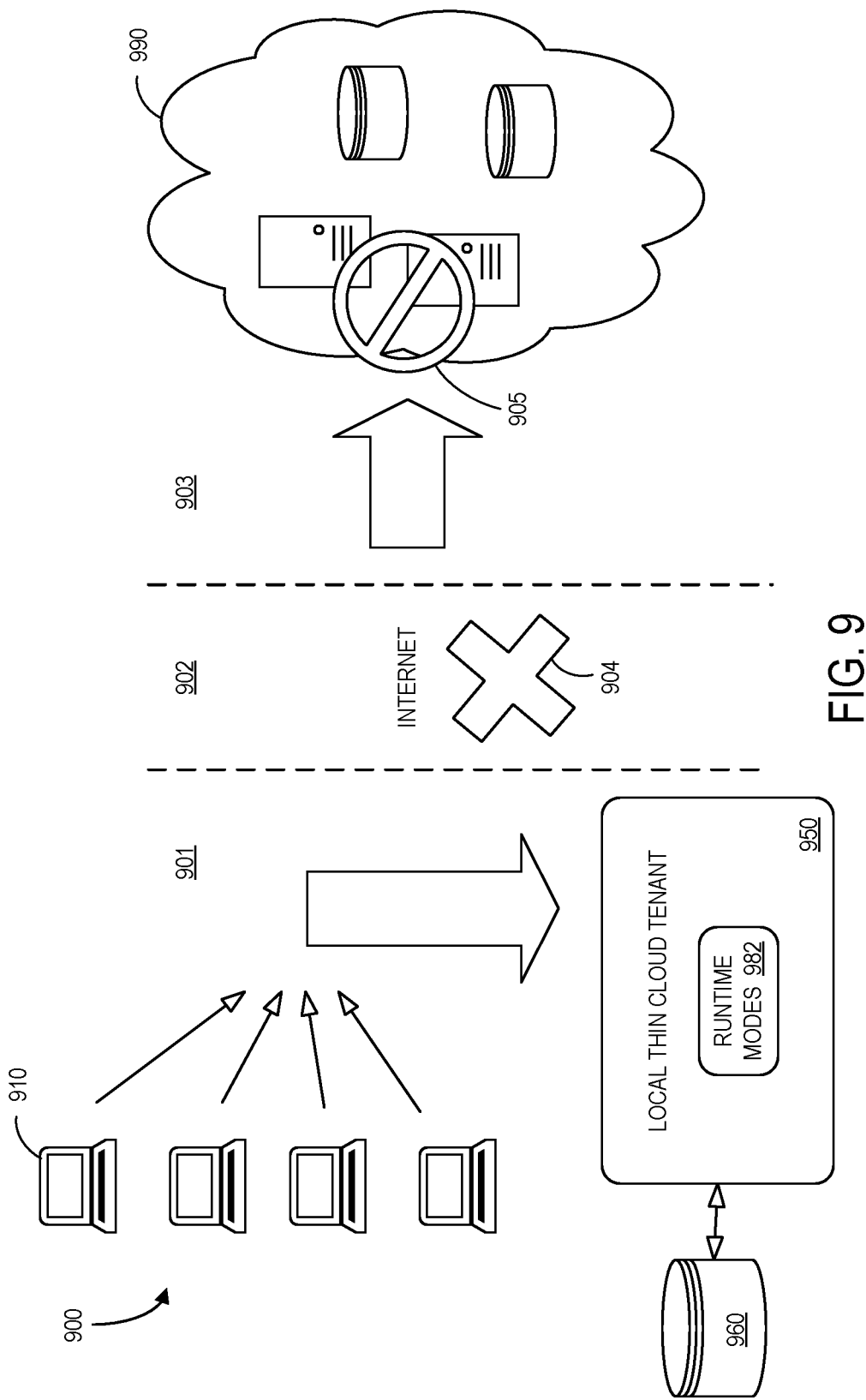
FIG. 9 illustrates a system having various runtime modes according to some embodiments.

FIG. 9 illustrates a system 900 having various "runtime modes" according to some embodiments. As before, a failed Internet 902 connection 904 or problem 905 at a data center 990 may completely prevent local user devices 910 on a user side 901 from accessing a remote user cloud application 990 at the data center side 903. Instead, requests from the local user devices 910 are served by a local thin cloud tenant 950 (e.g., based on information in the user synchronization data store 960) once it identifies that a connectivity issue to the cloud exists. In this embodiment, a runtime modes module 982 may place the local thin cloud tenant 950 in a "sleep" runtime mode, a "rise" runtime mode, or a "sunset" runtime mode. The sleep runtime mode means the cloud application is working expected and is available (and the local thin cloud tenant 950 is not serving any requests). In this mode, a continuous synchronization of application, database schema, and data may be performed and the local thin cloud tenant 950 may periodically check cloud availability and, if the cloud offline, the runtime mode may be switched to "rise." In the rise runtime mode, the cloud application is not available is some reason (e.g., a cloud issue or internet connectivity issue). In this case, the local thin cloud tenant will serve clients requests (because the cloud application is not available) and check cloud availability (if cloud returns online, the runtime mode may be switched to "sunset.").

Figure 10:
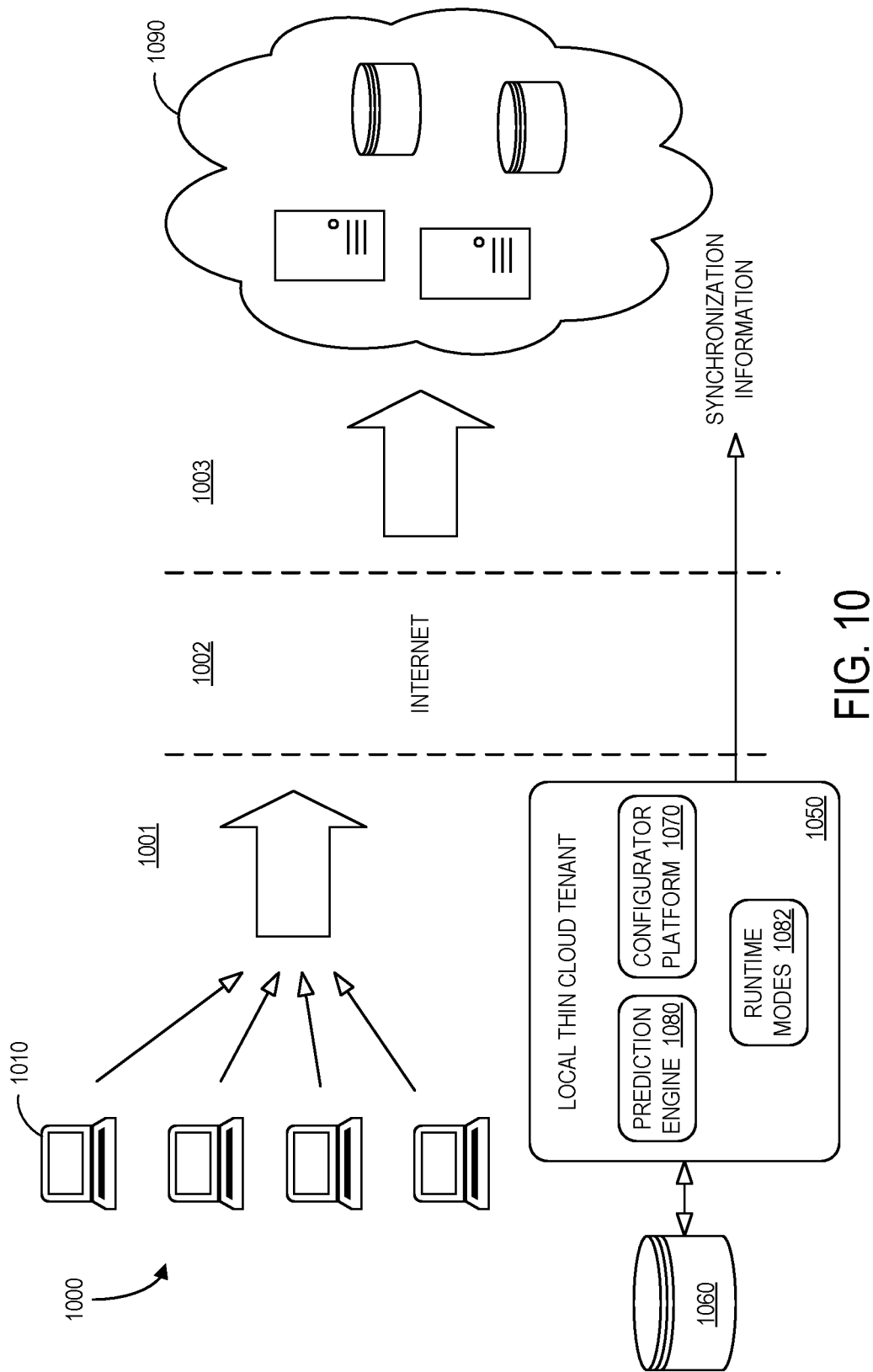
FIG. 10 is an overall block diagram of a system according to some embodiments.

FIG. 10 is an overall block diagram of a system 1000 according to some embodiments. In this example, the remote user cloud application 1090 (data center side 1003) has come back online and can be accessed by local user devices 1010 (user side 1001) via the Internet 1002. The local thin cloud tenant 1050 (including a configurator platform 1070, prediction engine 1080, and runtime modes 1082) along with a user synchronization data store 1060 will be placed into the "sunset" runtime mode. In the sunset runtime mode, all requests for standard and important services will be re-directed to the now available cloud solution. With respect to critical services that were updated when the cloud was offline, the local thin cloud tenant 1050 will stop serving user requests and synchronize data back to the cloud. With respect to services that where not changed when the cloud was offline, the local thin cloud tenant 1050 will simply redirect all requests to back to the now available cloud solution and place the local thin cloud tenant 1050 tenant back to "sleep" (and background synchronization will be performed until the next exit from mode).

Figure 11:
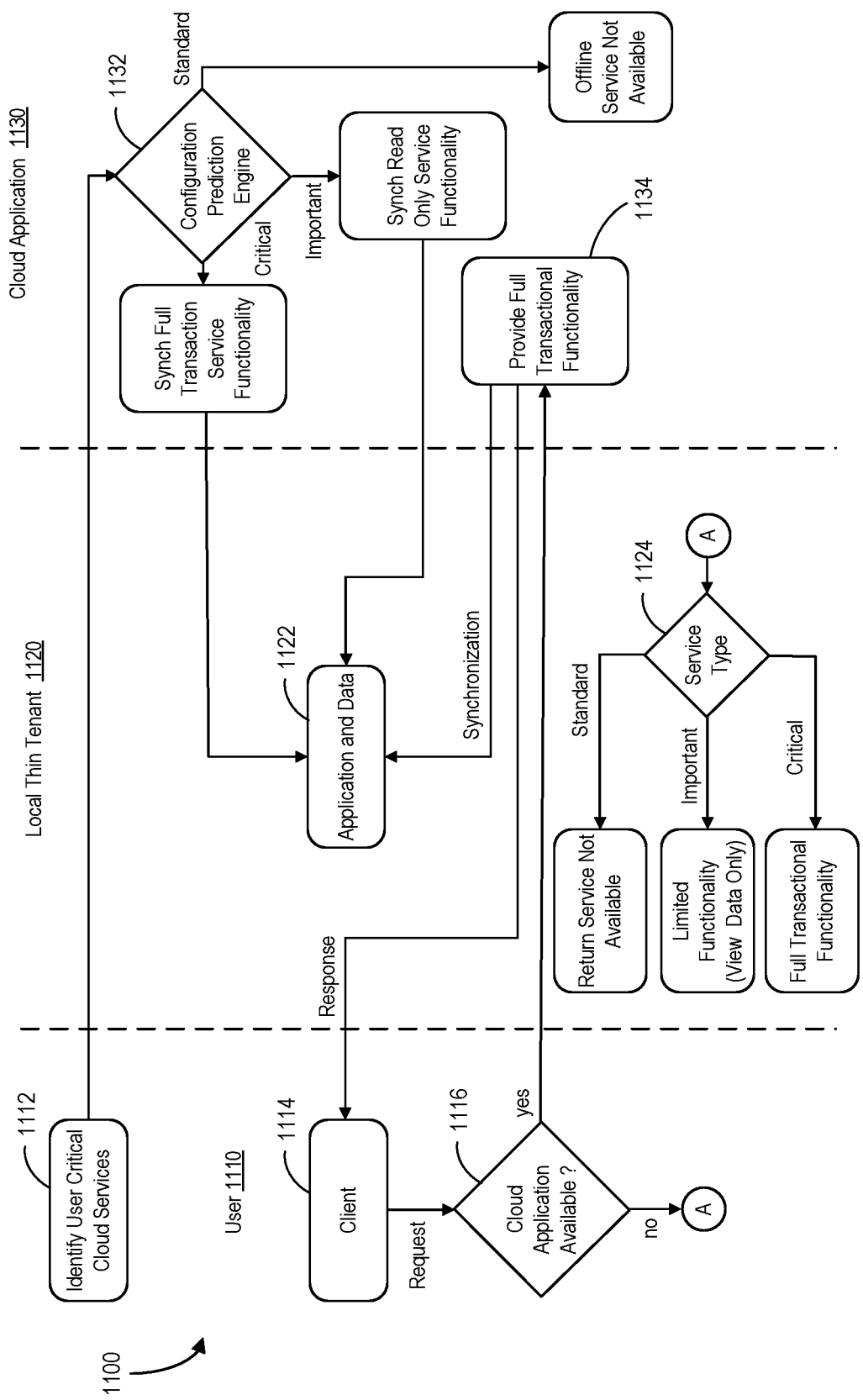
FIG. 11 is a cross-functional information flow diagram in accordance with some embodiments.

FIG. 11 is a cross-functional information flow diagram 1100 in accordance with some embodiments. The diagram 1100 includes user 1110 functions, local thin tenant 1120 function, and cloud application 1130 functions. The user 1110 function may identify user critical cloud services 1112. Based on that information, a configuration prediction engine 1132 arranges to synchronize full transaction service functionality for "critical" services, synchronize "read only" service functionality for "important services," and not provide only offline service for "standard" services. The application and data 112 are then updated as appropriate.

When a client 1114 issues a request, and the cloud application is available 1116, the cloud application 1130 provides full transactional functionality 1134. If the cloud application is not available 1116, the local thin tenant 1120 arranges 1124 for service to not be available for a "standard" service type, limited functionality (view only) for an "important" service type, and full transaction functionality for a "critical" service type.

Figure 12:
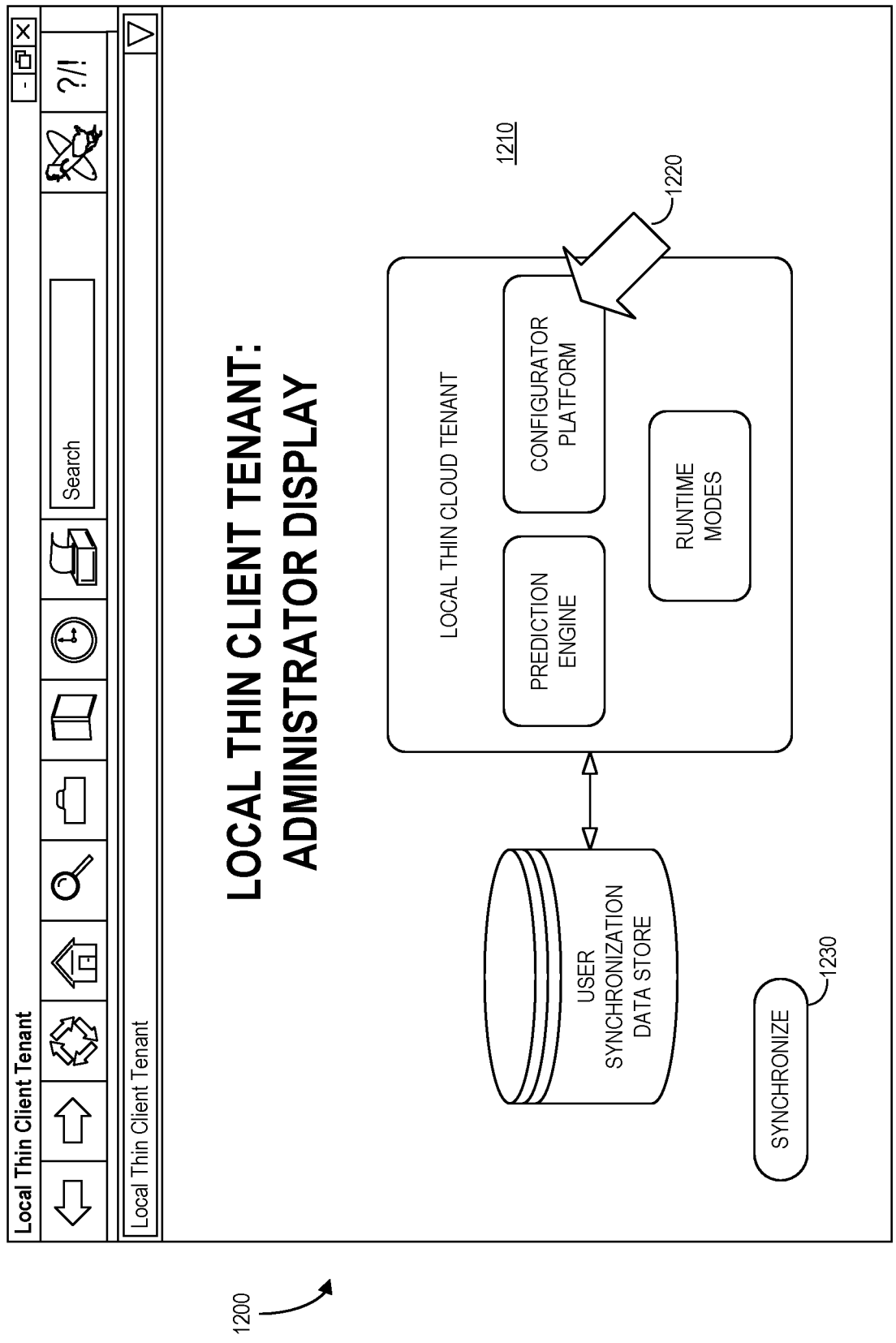
FIG. 12 is a local thin cloud tenant administrator display according to some embodiments.

Note that an administrator may arrange to monitor or adjust local thin cloud tenant settings. For example, FIG. 12 is a local thin cloud tenant administrator display 1200 according to some embodiments. The display 1200 may provide a graphical depiction of local thin cloud tenant 1210 (e.g., including a prediction engine, user synchronization data store, etc.) to an operator and/or to provide an interactive interface allowing an administrator to adjust system components as appropriate. Selection of an element on the display 1200 (e.g., via a touchscreen or computer mouse pointer 1220) may let the operator see more information about that particular element (e.g., in a pop-up window) and/or adjust operation of that element (e.g., by altering or overriding prediction logic that automatically configures application services).

Figure 13:
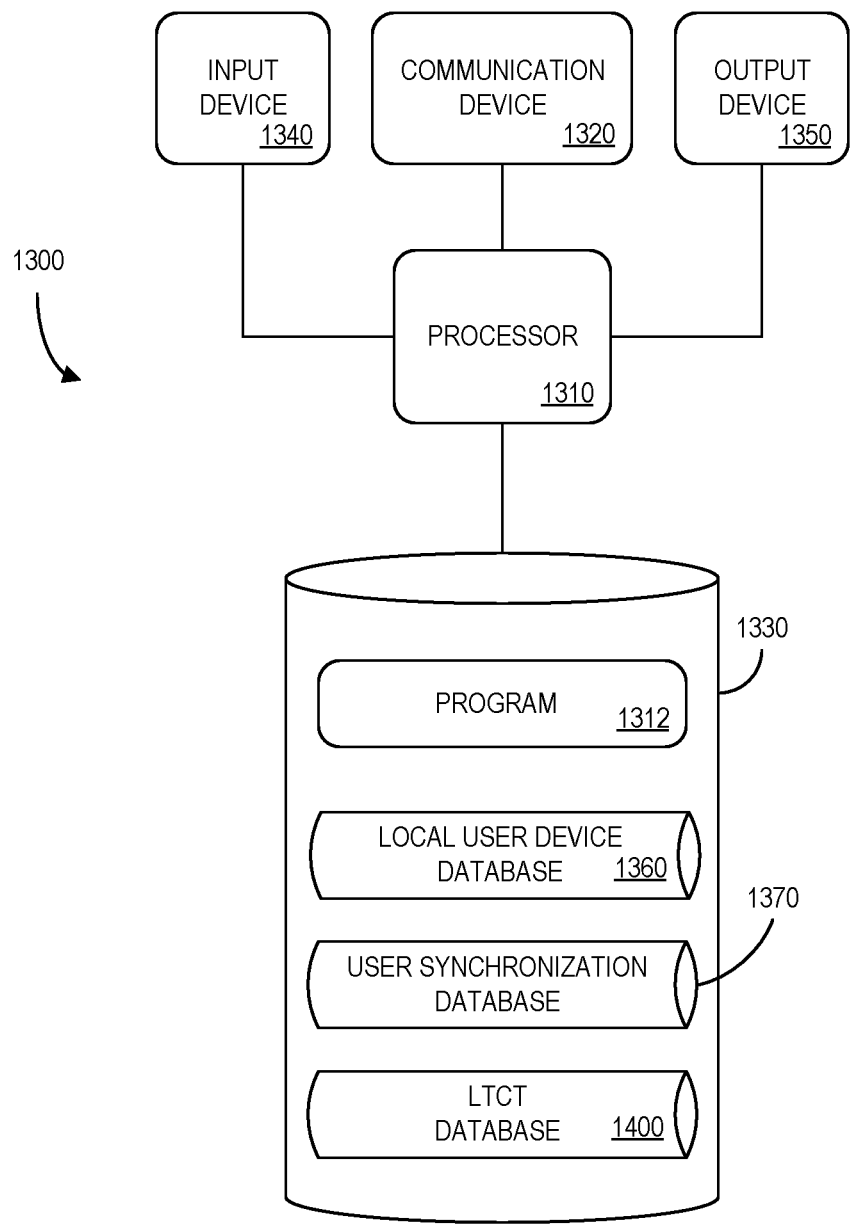
FIG. 13 is a high-level diagram of an apparatus or platform in accordance with some embodiments.

The embodiments described herein may be implemented using any of a number of different computer hardware implementations. FIG. 13 is a block diagram of apparatus 1300 according to some embodiments (e.g., the systems 300, 500 of FIGS. 3 and 5, respectively). The apparatus 1300 may comprise a general-purpose computing apparatus and may execute program code to perform any of the functions described herein. The apparatus 1300 may include other unshown elements according to some embodiments. According to some embodiments, the apparatus 1300 includes a processor 1310 operatively coupled to a communication device 1320, a data storage device 1330, one or more input devices 1340, one or more output devices 1350, and/or a memory 1360. The communication device 1320 may facilitate communication with external devices, such as a remote user device. The input device(s) 1340 may comprise, for example, a keyboard, a keypad, a mouse or other pointing device, a microphone, knob or a switch, an Infra-Red ("IR") port, a docking station, and/or a touch screen. The input device(s) 1340 may be used, for example, to enter information into the apparatus 1300 (e.g., configuration prediction logic, user priorities and mappings to an enterprise, etc.). The output device(s) 1350 may comprise, for example, a display (e.g., a display screen) a speaker, and/or a printer (e.g., to provide configuration settings to an administrator or operator, summary reports, troubleshooting information, etc.).

The data storage device 1330 may comprise any appropriate persistent storage device, including combinations of magnetic storage devices (e.g., magnetic tape, hard disk drives and flash memory), optical storage devices, Read Only Memory ("ROM") devices, etc., while the memory 1360 may comprise Random Access Memory ("RAM").

The program code 1312 may be executed by the processor 1310 to cause the apparatus 1300 to perform any one or more of the processes described herein. Embodiments are not limited to execution of these processes by a single apparatus. The data storage device 1330 may also store data and other program code for providing additional functionality and/or which are necessary for operation thereof, such as device drivers, Operating System ("OS") files, etc. For example, the processor 1310 may receive synchronization information from the remote user cloud application and store it into a user synchronization data store. When the processor 1310 determines that a remote user cloud application is unable to respond to a request from a local user device, the synchronization information in the user synchronization data store may be accessed to provide limited functionality associated with the remote user cloud application. The processor 1310 may then transmit a response to the request from the local user device.

In some embodiments (such as shown in FIG. 13), the storage device 1330 further stores a local user device database 1360 (e.g., containing information about local user devices that might transmit requests), a user synchronization database 1370 (to store synchronization information for a data center), and a Local Thin Cloud Tenant ("LTCT") database 1400. An example of a database that may be used in connection with the apparatus 1300 will now be described in detail with respect to FIG. 14. Note that the database described herein is only one example, and additional and/or different information may be stored therein. Moreover, various databases might be split or combined in accordance with any of the embodiments described herein.

Figure 14:
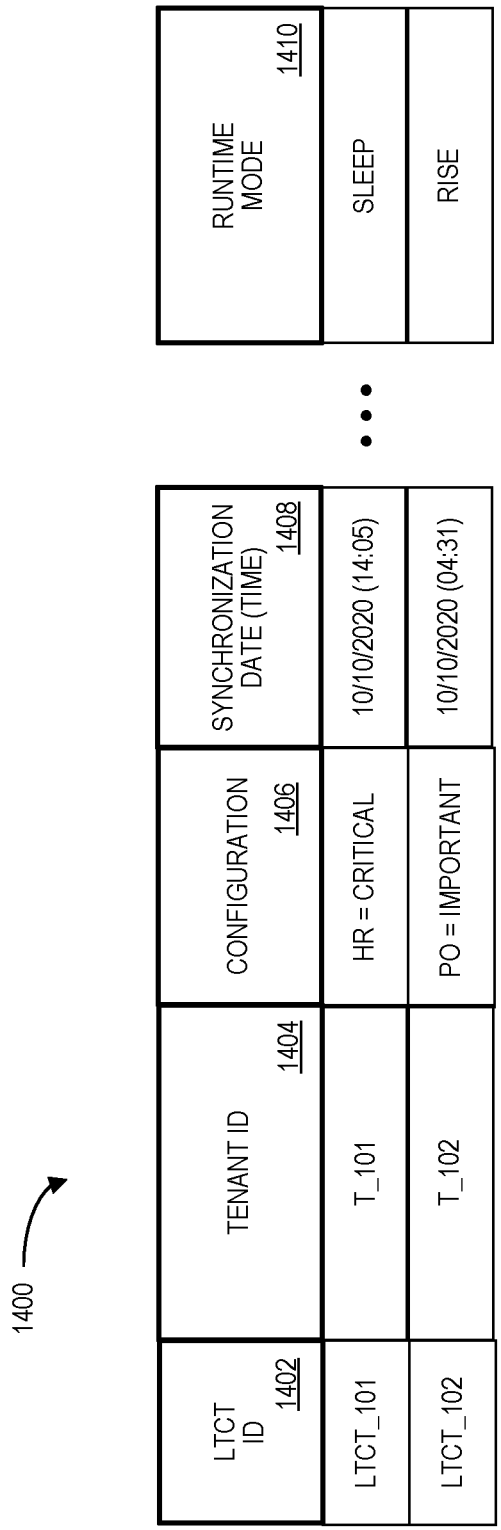
FIG. 14 is a portion of a local thin cloud tenant database according to some embodiments.

Referring to FIG. 14, a table is shown that represents the local thin cloud tenant database 1400 that may be stored at the apparatus 1300 according to some embodiments. The table may include, for example, entries identifying various local thin cloud tenants currently deployed. The table may also define fields 1402, 1404, 1406, 1408, 1410 for each of the entries. The fields 1402, 1404, 1406, 1408, 1410 may, according to some embodiments, specify: a local thin cloud tenant identifier 1402, a tenant identifier 1404, configuration 1406 information, a synchronization date and time 1408, and current runtime mode 1410. The local thin cloud tenant database 1400 may be created and updated, for example, based on information received via an administrator, a prediction engine, a data center, etc.

The local thin cloud tenant identifier 1402 may be, for example, a unique alphanumeric code identifying a local thin cloud tenant that has been deployed to help service local user devices in the event a data center becomes unavailable. The tenant identifier 1404 indicates the tenant (e.g., enterprise) being serviced. The configuration 1406 information may identify a level of functionality that will need to be provided (e.g., standard, critical, importance, etc.). The synchronization date and time indicate the last exchange of information between the local thin cloud tenant and a data center. The runtime mode 1410 indicates whether the local thin cloud tenant is currently in "sleep" mode (the data center is available), "rise" mode (the data center is unavailable), or "sunset" mode (the data center has returned and is once again available).

Thus, embodiments may provide several advantages, such as providing systems and methods to facilitate local, limited support of user cloud applications in an automated and logical manner. This may reduce cloud application downtime for an enterprise, avoiding the costs and loss of productivity associated with that experience.

Figure 15:
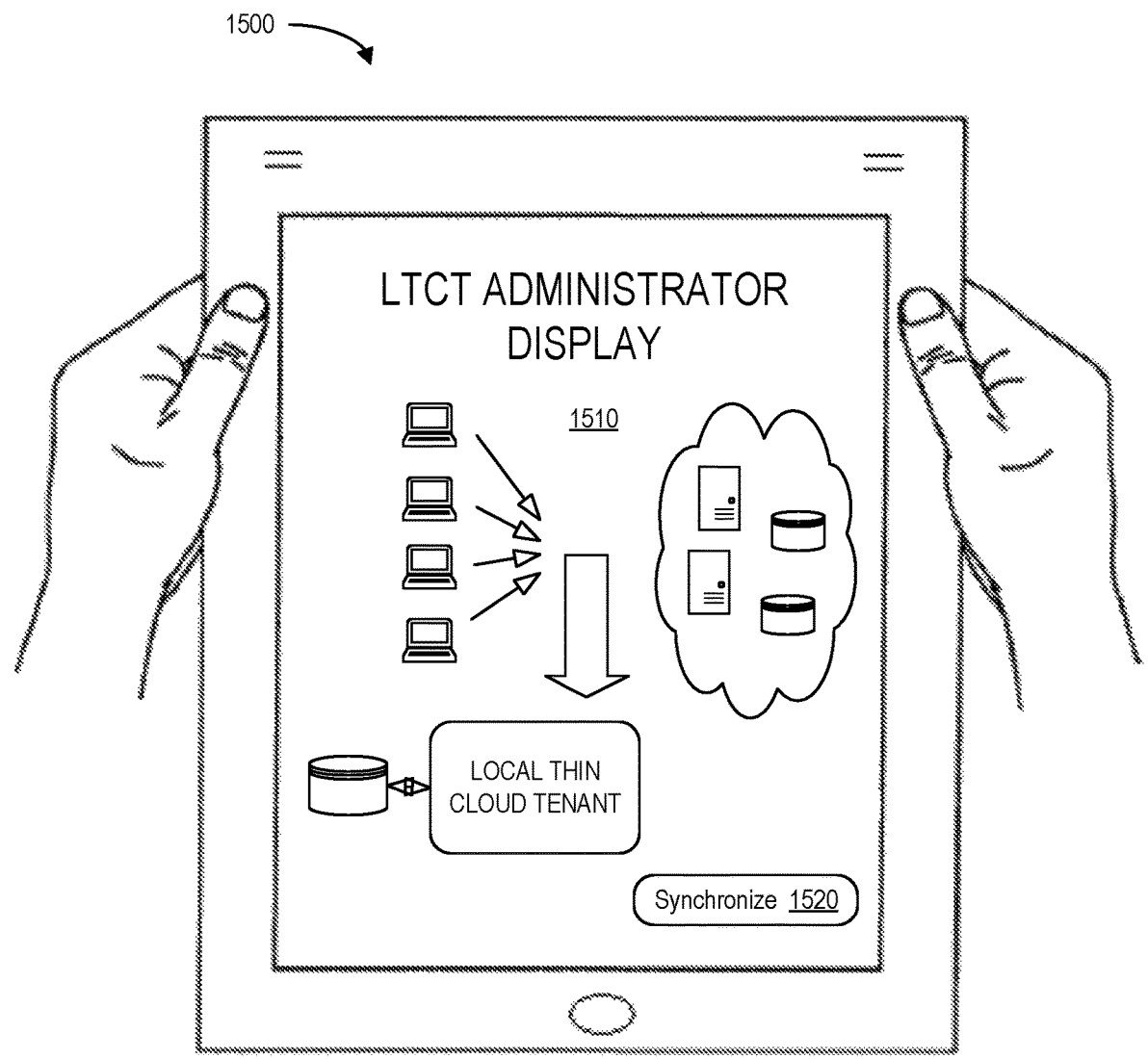
FIG. 15 illustrates a handheld tablet computer in accordance with some embodiments.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein. Moreover, the displays described are provided only as examples and other types of displays might be implemented. For example, FIG. 15 shows a handheld tablet computer 1500 in accordance with some embodiments. A display 1510 might provide information about a local thin cloud tenant and one or more icons 1520 may be selected by the user to adjust operation of the system (e.g., by initiating a synchronization process, manually overriding configuration prediction logic, etc.).

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer system associated with a remote user cloud application executing at a data center, comprising:
   (a) a user synchronization data store; and
   (b) a local thin cloud tenant computer platform, coupled to the user synchronization data store and to the remote user cloud application executing at the data center via a distributed communication network and being associated with a rise runtime mode and a sunset runtime mode, including:
   a configurator platform, stored on a hardware computer memory and executed by a hardware computer processor, that automatically configures limited functionality associated with the remote user cloud application, including:
   a prediction engine, stored on the hardware computer memory and executed by the hardware computer processor, that predicts a future request level of usage for local user devices based on historical requests from local user devices, including time information of the historical requests, wherein the predicted future request level of usage indicates at least one of: (i) heavy usage and (ii) light usage, wherein the limited functionality is automatically configured based on the predicted future request level of usage,
   the hardware computer processor, and
   the hardware computer memory, coupled to the hardware computer processor, storing instruction that, when executed by the hardware computer processor, cause the local thin cloud tenant computer platform to:
   (i) receive synchronization information from the remote user cloud application,
   (ii) store the synchronization information into the user synchronization data store,
   (iii) determine that the remote user cloud application is unable to respond to a request from a local user device,
   (iv) access the synchronization information in the user synchronization data store to provide limited functionality associated with the remote user cloud application as configured by the configurator platform, wherein the limited functionality comprises (i) no service for a standard service type, (ii) limited functionality with view only data for an important service type, and (iii) full transactional functionality for a critical service type, and wherein the configurator platform configures the limited functionality based on a hardware configuration, network bandwidth, and latency information,
   (v) transmit a response to the request from the local user device;
   (vi) determine that the remote user cloud application is able to respond to requests from local user devices; and
   (vii) transmit update information to the remote user cloud application based on the limited functionality previously provided to the local user devices.

2. The system of claim 1, wherein the configurator platform further configures the limited functionality based on at least one of: (i) a storage limitation and (ii) a manual override from an administrator.

3. The system of claim 1, wherein the historical requests include information about at least one of: (i) a time-of-day, (ii) a day-of-week, (iii) a day-of-month, and (iv) a time-of-year.

4. The system of claim 1, wherein the local thin cloud tenant computer platform is further associated with a sleep runtime mode.

5. A computer-implemented method associated with a remote user cloud application executing at a data center, comprising:

predicting, by a prediction engine, a future request level of usage for local user devices based on historical requests from local user devices, including time information of the historical requests, wherein the predicted future request level of usage indicates at least one of: (i) heavy usage and (ii) light usage;

automatically configuring, by a configurator platform, limited functionality associated with the remote user cloud application based on the predicted future request level of usage;

receiving, at a local thin cloud tenant computer platform coupled to a user synchronization data store and to the remote user cloud application executing at the data center via a distributed communication network, synchronization information from the remote user cloud application, wherein the local thin cloud tenant computer platform is included in the local thin cloud tenant computer platform and is associated with a rise runtime mode and a sunset runtime mode;

storing the synchronization information, by the local thin cloud tenant computer platform, into the user synchronization data store;

determining, by the local thin cloud tenant computer platform, that the remote user cloud application is unable to respond to a request from a local user device;

accessing, by the local thin cloud tenant computer platform, the synchronization information in the user synchronization data store to provide limited functionality associated with the remote user cloud application as configured by the configurator platform, wherein the limited functionality comprises (i) no service for a standard service type, (ii) limited functionality with view only data for an important service type, and (iii) full transactional functionality for a critical service type, and wherein the configurator platform configures the limited functionality based on a hardware configuration, network bandwidth, and latency information;

transmitting, by the local thin cloud tenant computer platform, a response to the request from the local user device;

determining, by the local thin cloud tenant computer platform, that the remote user cloud application is able to respond to requests from local user devices; and transmitting, by the local thin cloud tenant computer platform, update information to the remote user cloud application based on the limited functionality previously provided to the local user devices.

6. The method of claim 5, wherein the configurator platform further configures the limited functionality based on at least one of: (i) a storage limitation and (ii) a manual override from an administrator.

7. The method of claim 5, wherein the time information of the historical requests include information about at least one of: (i) a time-of-day, (ii) a day-of-week, (iii) a day-of-month, and (iv) a time-of-year.

8. The method of claim 5, wherein the local thin cloud tenant computer platform is further associated with a sleep runtime mode.

9. A non-transitory, computer-readable medium storing program code, the program code executable by a hardware computer processor to cause the hardware computer processor to perform a method associated with a remote user cloud application executing at a data center, the method comprising:

predicting, by a prediction engine, a future request level of usage for local user devices based on historical requests from local user devices, including time information of the historical requests, wherein the predicted future request level of usage indicates at least one of: (i) heavy usage and (ii) light usage;

automatically configuring, by a configurator platform, limited functionality associated with the remote user cloud application based on the predicted future request level of usage;

receiving, at a local thin cloud tenant computer platform coupled to a user synchronization data store and to the remote user cloud application executing at the data center via a distributed communication network, synchronization information from the remote user cloud application, wherein the local thin cloud tenant computer platform is included in the local thin cloud tenant computer platform and is associated with a rise runtime mode and a sunset runtime mode;

storing the synchronization information, by the local thin cloud tenant computer platform, into the user synchronization data store;

determining, by the local thin cloud tenant computer platform, that the remote user cloud application is unable to respond to a request from a local user device;

accessing, by the local thin cloud tenant computer platform, the synchronization information in the user synchronization data store to provide limited functionality associated with the remote user cloud application as configured by the configurator platform, wherein the limited functionality comprises (i) no service for a standard service type, (ii) limited functionality with view only data for an important service type, and (iii) full transactional functionality for a critical service type, and wherein the configurator platform configures the limited functionality based on a hardware configuration, network bandwidth, and latency information;

transmitting, by the local thin cloud tenant computer platform, a response to the request from the local user device;

determining, by the local thin cloud tenant computer platform, that the remote user cloud application is able to respond to requests from local user devices; and transmitting, by the local thin cloud tenant computer platform, update information to the remote user cloud application based on the limited functionality previously provided to the local user devices.

10. The medium of claim 9, wherein the configurator platform further configures the limited functionality based on at least one of: (i) a storage limitation and (ii) a manual override from an administrator.

* * * * *